United States Patent
Shibata et al.

(10) Patent No.: US 7,190,643 B2
(45) Date of Patent: Mar. 13, 2007

(54) LAND PRE-PIT ADDRESS DEMODULATING DEVICE

(75) Inventors: Akihiro Shibata, Takatsuki (JP); Dai Ichiryu, Hirakata (JP); Takamasa Sakai, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 541 days.

(21) Appl. No.: 10/837,569

(22) Filed: May 4, 2004

(65) Prior Publication Data

US 2005/0078572 A1   Apr. 14, 2005

(30) Foreign Application Priority Data

Oct. 8, 2003   (JP)   ............... 2003-350019

(51) Int. Cl.
*G11B 7/00* (2006.01)
*G11B 5/09* (2006.01)

(52) U.S. Cl. ............................. 369/44.26; 369/47.28; 369/53.28

(58) Field of Classification Search ............ 369/44.26, 369/47.27, 53.28; *G11B 7/00, 5/09*
See application file for complete search history.

(56) References Cited

U.S. PATENT DOCUMENTS 6,700,846 B2 * 3/2004 Furuichi et al. ......... 369/53.22
6,859,425 B2 * 2/2005 Maegawa et al. .......... 369/47.3

FOREIGN PATENT DOCUMENTS

JP   P2002-216363 A   8/2002

* cited by examiner

*Primary Examiner*—A M Psitos
(74) *Attorney, Agent, or Firm*—McDermott Will & Emery LLP

(57) ABSTRACT

In a land pre-pit address demodulating device DM for detecting land pre-pit address information during recording to a DVD-R/RW-disc, a tracking error signal TE is muted by a first reference potential $V_{ref1}$ during a period in which the tracking error signal TE is generated from a reflected laser beam having a power for recording a mark, an RF residual component is removed from the tracking error signal TE, and the tracking error signal TE from which the RF residual component has been removed is compared with a second reference potential $V_{ref2}$, thereby detecting a land pre-pit address signal.

10 Claims, 15 Drawing Sheets

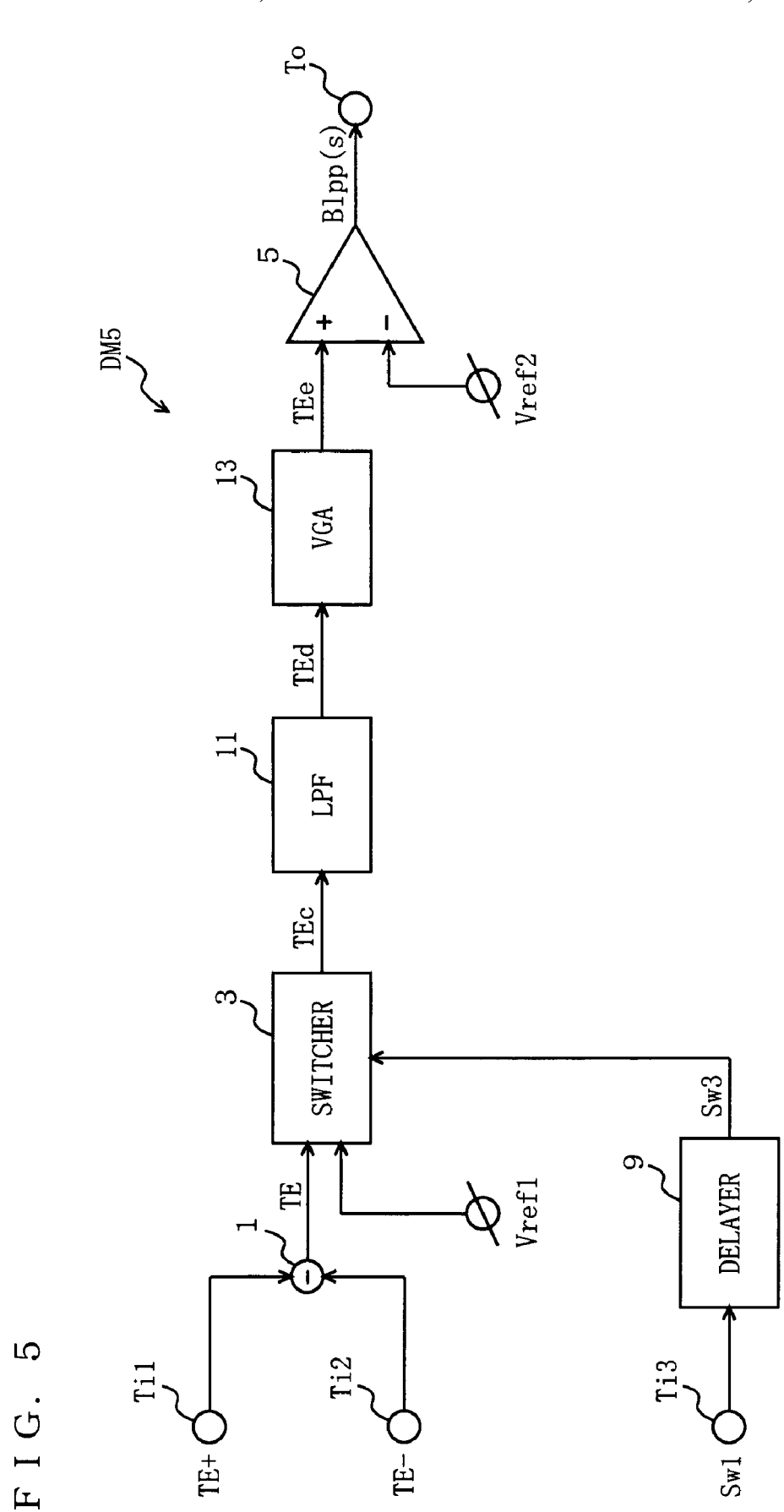
F I G. 5

LAND PRE-PIT ADDRESS DEMODULATING DEVICE

BACKGROUND OF THE INVENTION

1. Field of the Invention

The present invention relates to a land pre-pit address demodulating device, which detects a land pre-pit address from light reflected by a DVD-R/RW disc, and more particularly to a land pre-pit address demodulating device for use in an optical disc recording apparatus which records data to the DVD-R/RW disc.

2. Description of the Background Art

DVD-R/RW is a format for recording/reproducing information to/from an optical disc. A first feature of the DVD-R/RW format is that in order to increase compatibility with DVD-ROM format, address information, which is required for specifying an address where information is recorded or reproduced, is formed in a space portion (also referred to as a "land") between guide grooves (also simply referred to as "grooves") of a disc on which information recording or reproduction is performed. The address as described above is referred to as a "land pre-pit (LPP) address". The term "LPP" refers to a pit which is characteristic of the DVD-R/RW format and represents an address formed in a wobble groove for indicating location information for disc recording, and the LPP address refers to location information represented by an LPP.

The optical disc has an area called "track" where information is recorded as a mark. When following the track, a tracking detector provided in an optical disc apparatus detects incident light and generates a plurality of light intensity signals. Address information is detected based on a differential signal obtained via subtraction between the plurality of light intensity signals, while information to be recorded/reproduced is detected based on an addition signal obtained via addition of the plurality of light intensity signals.

A second feature of the DVD-R/RW format is that wobbles are formed in the optical disc such that the guide groove wiggles at a prescribed frequency in a radial direction. A wobble signal, which is obtained based on the wobbles, is used as a reference signal for generating a clock signal for information recording and reproduction. Similar to the address information, the wobbles are detected based on a differential signal obtained via subtraction between a plurality of light intensity signals.

In an optical disc recording/reproduction apparatus, in a simplistic sense, recording of information to a DVD-R/RW disc is performed by irradiating the track with a recording laser beam which alternately changes its intensity between high and low. Specifically, a high intensity laser beam is irradiated to heat a recording coating so as to become amorphous, and thereafter the heated recording coating is rapidly cooled, thereby forming a low reflective mark. Then, a low intensity laser beam is irradiated to crystallize the recording coating, thereby forming a high reflective space. In this manner, a mark is formed as a pit on the track between two spaces.

A tracking detector provided on an optical head is divided into four portions by two divide lines respectively parallel and perpendicular to a direction along the track. In other words, there are four tracking detectors A, B, C, and D along a circumferential direction of the optical disc. Note that the tracking detectors A and D are divided from the tracking detectors B and C by the divide line parallel to the track. Each of the four tracking detectors A, B, C, and D detects the intensity of a laser beam irradiated by the optical head and reflected by the optical disc, and outputs the detected intensity of the laser beam.

The tracking detectors A, B, C, and D output light intensity signals $T_a$, $T_b$, $T_c$, and $T_d$, respectively. The light intensity signals $T_a$ and $T_d$ are added to become a TE+ signal, and the light intensity signals $T_b$ and $T_c$ are added to become a TE− signal. That is, the tracking detectors A and D and the tracking detectors B and C can be considered as being two tracking detectors AD and BC divided by the divide line parallel to the track. A difference between the TE+ and TE− signals respectively outputted from the two tracking detectors AD and BC forms a tracking error signal TE. This is represented by TE=(TE+)−(TE−).

Referring to FIGS. 12, 13, 14, 15, and 16, described next is a land pre-pit address demodulating device included in a conventional optical disc recording/reproduction apparatus proposed in Japanese Patent Laid-Open Publication No. 2002-216363. As shown in FIG. 12, a land pre-pit address demodulating device $DM_c$ includes a first input terminal $T_{i1}$, a second input terminal $T_{i2}$, a subtractor 1, a comparator $5_c$, and an output terminal $T_o$. The first and second input terminals $T_{i1}$ and $T_{i2}$ are respectively connected to the above-mentioned tracking detectors AD and BC, such that the TE+ and TE− signals are inputted to the first and second input terminals $T_{i1}$ and $T_{i2}$, respectively.

FIGS. 13 and 14 show waveforms of the TE+ and TE− signals, respectively. As shown in FIG. 13, the TE+ signal includes: a radio frequency (RF) component $E_{rf}$ an envelope of which varies sinusoidally; and an LPP component $E_{lpp}$ at each peak of the RF component $E_{rf}$. Note that the envelope of the RF component $E_{rf}$ represents a wobble component $E_{wbl}$. As shown in FIG. 14, basically, the TE− signal has a waveform similar but opposite in sign to the waveform of the TE+ signal. Whether a mark portion or a space portion is on the high potential side depends on properties of an optical pickup to be used. In examples shown in FIGS. 1 and 2, the mark portion is on the high potential side.

In general, the term "mark" refers to a pit portion formed on a disc, and the term "space" refers to a region between pits. In the present specification, however, in order to avoid redundancy in description, the term "mark" may also refer to a voltage level corresponding to the mark portion among voltage levels of an electric signal into which a detector converts light reflected by the disc, and the term "space" may also refer to a voltage level corresponding to the space portion among the voltage levels of the electric signal.

The subtractor 1 is connected to the first and second input terminals $T_{i1}$ and $T_{i2}$ and subtracts an inputted TE− signal from an inputted TE+ signal, thereby generating a tracking error signal TE to be outputted therefrom.

FIG. 15 shows a waveform of the tracking error signal TE. In principle, by subtracting the TE− signal from the TE+ signal, it is possible to remove an RF component (i.e., a signal portion corresponding to the mark and the space) and thereby to extract the wobble component $E_{wbl}$ and the LPP component $E_{lpp}$. In FIG. 15, the wobble component $E_{wbl}$ corresponds to a low frequency, and the LPP component $E_{lpp}$ corresponds to a pulse at a peak of the wobble component $E_{wbl}$.

The comparator $5_c$ has two input ports respectively connected to the subtractor 1 and a reference potential $V_{ref}$. Specifically, the comparator $5_c$ binarizes the tracking error signal TE, which is inputted from the subtractor 1, using levels of the reference potential $V_{ref}$ as an LPP binarization level $L_1$ and a WBL binarization level $L_w$, thereby generating an LPP binarized signal $B_p$ to be outputted from the output terminal $T_o$.

FIG. 16 shows waveforms of various signals obtained by adjusting a level at which to binarize the tracking error signal TE. In FIG. 16, dotted line $L_w$ represents the WBL binarization level $L_w$ which is used as a threshold value for binarizing a wobble signal component of the tracking error signal TE, and rectangular wave $B_w$ represents a WBL binarized signal $B_w$ to be obtained. Similarly, dotted line $L_1$ represents the LPP binarization level $L_1$ which is used as a threshold value for binarizing an LPP signal component of the tracking error signal TE, and rectangular wave $B_{lpp}$ represents an LPP binarized signal $B_{lpp}$. Note that the LPP binarized signal $B_{lpp}$ is also referred to as an LPP detection signal, and the WBL binarized signal $B_w$ is also referred to as a wobble detection signal.

The tracking error signal TE shown in FIGS. 15 and 16 is obtained in an on-track state where the center of a photodetector corresponds to the center of a disc groove. There is substantially no difference between the TE+ and TE− signals with respect to voltage levels of the mark portion and the space portion. In each of the TE+ and TE− signals, there is a considerable difference between maximum and minimum voltage levels of each of the mark portion and the space portion. Accordingly, in the tracking error signal TE, portions of the RF component $E_{rf}$ which correspond to the mark portion and the space portion, respectively, are clearly removed, and therefore LPP components $E_{lpp}$ are highly noticeable. Here, the height of an LPP component $E_{lpp}$ projecting from the wobble component $E_{wbl}$ is referred to as an "on-track LPP height $H_a$".

FIG. 17 shows a waveform of a tracking error signal TE obtained in an off-track state. Specifically, in a real optical disc recording/reproduction apparatus, the TE+ and TE− signals become nonuniform in amplitude depending on, for example, sensitivity of a light receiving element of the optical pickup, an impedance of a flexible wire conductor connecting the optical pickup to an IC chip, and a gain difference caused due to element-to-element variation between input amplifiers on the IC chip. As a result, portions of the RF component are left unremoved when the TE− signal is subtracted from the TE+ signal. In FIG. 17, the unremoved portions of the RF component correspond to portions between two sinusoidal waves. Hereinafter, the residue of the RF component is referred to as an "RF residual component $R_{rp}$".

The height of an LPP component $E_{lpp}$ projecting from a peak of the wobble component $E_{wbl}$ is lower than the on-track LPP height Ha by a height of the RF residual component $R_{rp}$. The height of the LPP component $E_{lpp}$ in this case is referred to as an "off-track LPP height $H_b$". That is, a relationship $H_a > H_b$ is established. Accordingly, even if the binarization level is determined as in the case of the on-track mode described in conjunction with FIG. 16, the LPP binarized signal $B_p$ or the WBL binarized signal $B_w$ cannot be correctly detected. Therefore, in the above-described conventional optical disc recording/reproduction apparatus, a gain adjustment is performed such that the RF component $E_{rf}$ has a uniform amplitude, in an attempt to increase a detection rate of the LPP.

However, in high-speed recording, an irradiation power per unit area of a recording laser beam is small, i.e., heat dissipation from a disc surface is increased during the high-speed recording, and therefore in order to form a mark similar to that generated in a low-speed recording, it is necessary to increase the irradiation power of the laser beam. In general, it is known that when a recording speed is doubled, the irradiation power of the laser beam is required to be increased to 1.41 times the normal irradiation power. On the other hand, it is known that the amount of a change in film quality of a disc is small in comparison to a change of the laser power, and therefore it is not necessary to increase the laser power in order to form a space portion during high-speed recording.

As described above, in the case of multiple-speed recording, i.e., high-speed recording, which is performed at a speed higher than a standard recording speed, the laser power is increased in order to form a mark portion. As a result, in each of the TE+ and TE− signals, the amplitude of light components reflected by the mark portion is increased, while the amplitude of light components reflected by a space portion is relatively decreased. In order to cancel the changes of the amplitudes of the light components reflected by the mark portion and the space portion, it is necessary to reduce a gain to the same level as an amplitude level in a low-speed recording, with consideration of a circuit dynamic range.

Consequently, as shown in FIG. 18, amplitude $E_{lpp(s)}$ of an LPP component, which overlaps with a space component of a post-subtraction tracking error signal TE, is also decreased. In this case, the amplitude of the RF residual component $R_{rp}$ does not change, and therefore the LPP component $E_{lpp(s)}$, which overlaps with the space component, is obscured, making it difficult to be detected. Accordingly, it may fairly be said that in the land pre-pit address demodulating device $DM_c$, the LPP binarized signal $B_{lpp}$ to be outputted from the comparator $5_c$ contains substantially only an LPP binarized signal $B_{lpp(m)}$ corresponding to a mark portion, except for few LPP binarized signal $B_{lpp(s)}$ corresponding to a space portion.

SUMMARY OF THE INVENTION

Therefore, an object of the present invention is to provide a land pre-pit address demodulating apparatus capable of detecting a land pre-pit address even in the case of a high-speed recording to a DVD-R/RW disc.

A first aspect of the present invention is directed to a land pre-pit address demodulating device for use in an optical disc recording apparatus which irradiates a DVD-R/RW disc with a laser beam, the optical disc recording apparatus switching a power of the laser beam between first and second intensities so as to generate an amorphous region with the laser beam of the first intensity and a recrystallized region with the laser beam of the second intensity, thereby recording information to the DVD-R/RW disc, the land pre-pit address demodulating device detecting land pre-pit address information from the laser beam reflected by the DVD-R/RW disc, the device comprising: a generation section for generating a tracking error signal from the reflected laser beam; a first reference potential section for supplying a first reference potential lower than a potential of the tracking error signal; a laser intensity indicating section for indicating whether the reflected laser beam from which the tracking error signal is generated is of the first intensity or the second intensity; an RF residual component removing section for removing an RF residual component from the tracking error signal by muting the tracking error signal with the first reference potential during a period in which the tracking error signal is generated from the reflected laser beam of the first intensity; and a land pre-pit address signal detection section for comparing the tracking error signal from which the RF residual component has been removed to a second reference potential and detecting a land pre-pit address signal.

The land pre-pit address demodulating device according to the present invention is capable of detecting a land pre-pit address even when recording to a DVD-R/RW is performed at a speed several-fold higher than a normal recording speed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram showing the configuration of a land pre-pit address demodulating device according to a fifth embodiment of the present invention;

DESCRIPTION OF THE PREFERRED EMBODIMENTS

A land pre-pit address demodulating apparatus DM according to the present invention is used and incorporated into an optical disc recording/reproduction apparatus which operates in a manner as described in the foregoing paragraphs. Accordingly, the description of the optical disc recording/reproduction apparatus is omitted unless there is a particular reason to provide an explanation thereof. Hereinbelow, features specific to the land pre-pit address demodulating apparatus DM according to the present invention are mainly described.

(First Embodiment)

Figure 1:
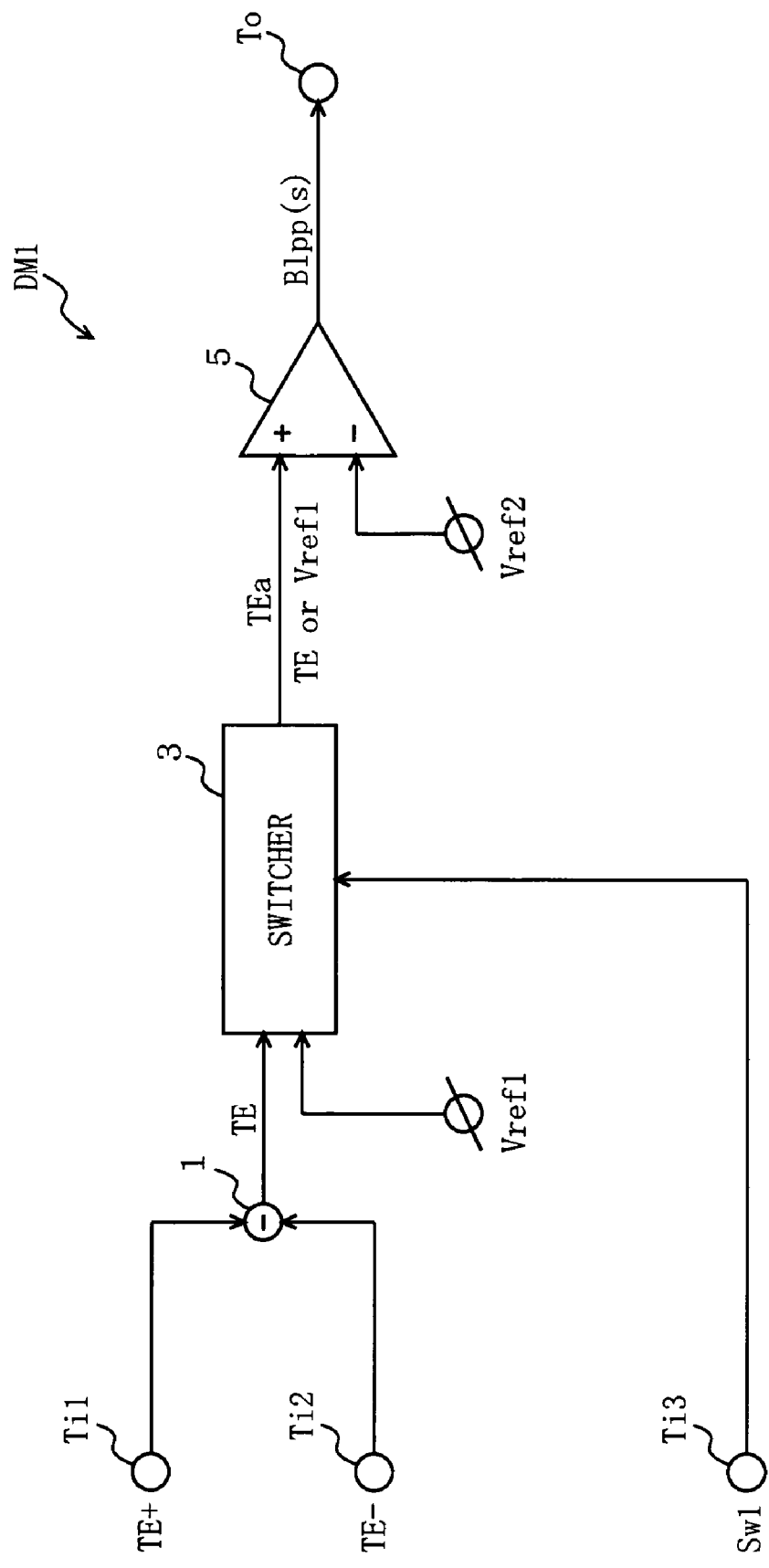
FIG. 1 is a block diagram showing the configuration of a land pre-pit address demodulating device according to a first embodiment of the present invention.

Referring to FIG. 1, a land pre-pit address demodulating apparatus DM, according to a first embodiment of the present invention includes a first input terminal $T_{i1}$, a second input terminal $T_{i2}$, a third input terminal $T_{i3}$, a subtractor 1, a switcher 3, a comparator 5, and an output terminal $T_o$. The first and second input terminals $T_{i1}$ and $T_{i2}$ are connected to the above-described tracking detectors AD and BC, respectively. TE+ and TE− signals are inputted into the first and second input terminals $T_{i1}$ and $T_{i2}$, respectively.

The subtractor 1 is connected to the first and second input terminals $T_{i1}$ and $T_{i2}$, and subtracts an inputted TE− signal from an inputted TE+ signal, thereby generating a tracking error signal TE to be outputted therefrom.

The third input terminal $T_{i3}$ is supplied with a first switch control signal $S_{w1}$ for controlling a timing for the optical disc recording/reproduction apparatus to switch recording laser powers in accordance with a mark and a space on the disc. For example, the first switch control signal $S_{w1}$ takes a high binary value when a mark portion is irradiated, and takes a low binary value when a space portion is irradiated.

The switcher 3 has two input ports, one of which is connected to the subtractor 1 from which the tracking error signal TE is inputted, and the other input port is applied with a first reference potential $V_{ref1}$. The switcher 3 is further connected to the third input terminal $T_{i3}$ from which the first switch control signal $S_{w1}$ is inputted.

The switcher 3 selects either of two signals inputted into the two input ports, i.e., either the tracking error signal TE or the first reference potential $V_{ref1}$, in accordance with the first switch control signal $S_{w1}$, and outputs the selected signal. Specifically, when the first switch control signal $S_{w1}$ is at a high level, i.e., when the signal indicates a timing of irradiation to the mark portion, the switcher 3 outputs the first reference potential $V_{ref1}$. Alternatively, when the first switch control signal $S_{w1}$ is at a low level, i.e., when the signal indicates a timing of irradiation to the space portion, the switcher 3 outputs the tracking error signal TE. Note that the first reference potential $V_{ref1}$ is set to such a value as to cancel an increase of a recording power for a high-speed recording of the mark portion. That is, the first reference potential $V_{ref1}$ functions to mute a tracking error signal TE from the mark portion. In this context, a signal outputted from the switcher 3 is referred to as a "first mute tracking error signal $TE_a$".

The comparator 5 has two input ports connected to the switcher 3 and a second reference potential $V_{ref2}$, respectively. Specifically, the comparator 5 binarizes a tracking error signal TE inputted from the switcher 3 using levels of the second reference potential $V_{ref2}$ as the LPP binary level $L_l$ and the WBL binary level $L_w$, which are described above with reference to FIG. 4, thereby generating an LPP binarized signal $B_{lpp(s)}$ to be outputted from the output terminal $T_o$.

The land pre-pit address demodulating device $DM_1$ according to the present embodiment mutes a tracking error signal TE from the mark portion in accordance with the first switch control signal $S_{w1}$. This is highly effective if the optical disc recording/reproduction apparatus, as well as the DVD-R/RW disc, are produced in high quality. Specifically, the land pre-pit address demodulating device $DM_1$ is effective for use in an optical disc recording/reproduction apparatus in which there is no delay from a circuit which generates a switch control signal $S_w$ to a circuit which removes an RF residual component $R_{rp}$ via an optical pickup. In such a case, it is not necessary to additionally provide means for detecting whether the tracking error signal TE corresponds to a light beam reflected by a mark portion or a space portion. Accordingly, the land pre-pit address demodulating device can be configured in a simple manner. This is also advantageous in view of production cost. Note that the land pre-pit address demodulating device may be configured so as to cancel an initial delay if it occurs.

(Second Embodiment)

Figure 2:
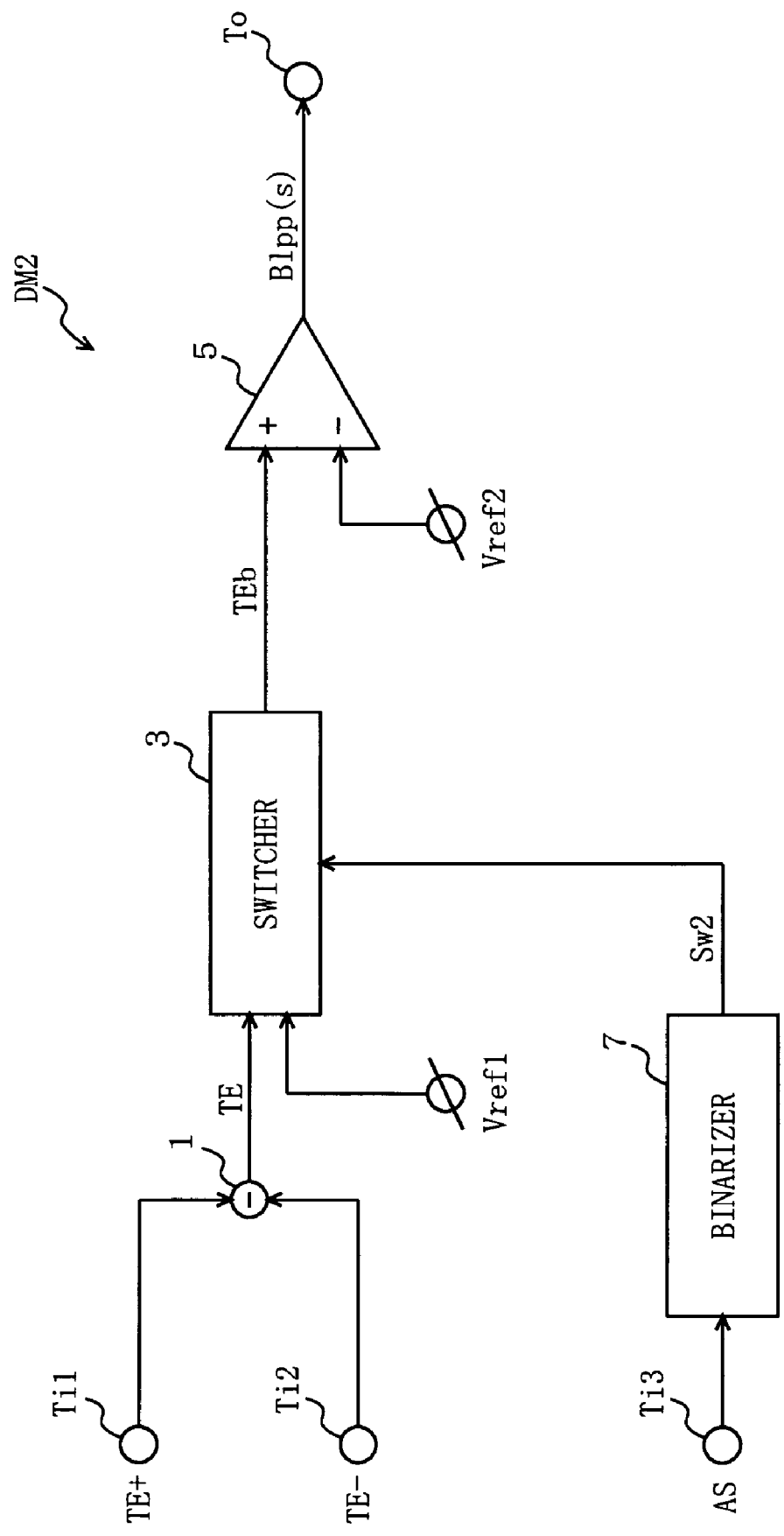
FIG. 2 is a block diagram showing the configuration of a land pre-pit address demodulating device according to a second embodiment of the present invention.

Referring to FIG. 2, a land pre-pit address demodulating device $DM_2$ according to a second embodiment additionally includes a binarizer 7 between the third input terminal $T_{i3}$ and the switcher 3 in the land pre-pit address demodulating device $DM_1$ shown in FIG. 1. The third input terminal $T_{i3}$ is supplied with a summation signal AS which is formed of outputs from the four tracking detectors A, B, C, and D. Specifically, in the present embodiment, the summation signal AS, which is a signal reflected by a disc and received via the optical pickup, is converted into a second switch control signal $S_{w2}$ which is at a high level if the summation signal AS is reflected from a mark portion or at a low level if the summation signal AS is reflected from a space portion.

The land pre-pit address demodulating device $DM_2$ according to the present embodiment mutes a tracking error signal TE from the mark portion in accordance with the second switch control signal $S_{w2}$ obtained by binarizing the summation signal AS. This is highly effective if the summation signal AS is generated in an IC chip of the optical disc recording/reproduction apparatus where there is no delay in the IC chip.

In the first embodiment, the land pre-pit address demodulating device $DM_1$ is required to cancel an initial delay if there is an initial delay in the optical disc recording/reproduction apparatus. However, in the present embodiment, the summation signal AS is generated in the IC chip, and therefore it is possible to eliminate the necessity of canceling the initial delay. One reason for this is that whether a laser beam is reflected from the mark portion or the space portion can be determined based on the summation signal AS, and therefore it is possible to accommodate production variability of discs or optical pickups. Another reason is that the land pre-pit address demodulating device $DM_2$ does not depend on a delay from a circuit, which generates a mark or a space, to a circuit, which removes an RF residual component via an optical pickup.

Note that the switcher 3 mutes the tracking error signal TE by the first reference potential $V_{ref1}$ in accordance with the second switch control signal $S_{w2}$, and outputs a second mute tracking error signal $TE_b$. The second mute tracking error signal $TE_b$ is basically the same as the above-described first mute tracking error signal $TE_a$ except that a timing signal for muting the second mute tracking error signal $TE_b$ is different from that for muting the first mute tracking error signal $TE_a$. Accordingly, a distinction is drawn between the first and second mute tracking error signals $TE_a$ and $TE_b$.

(Third Embodiment)

Figure 3:
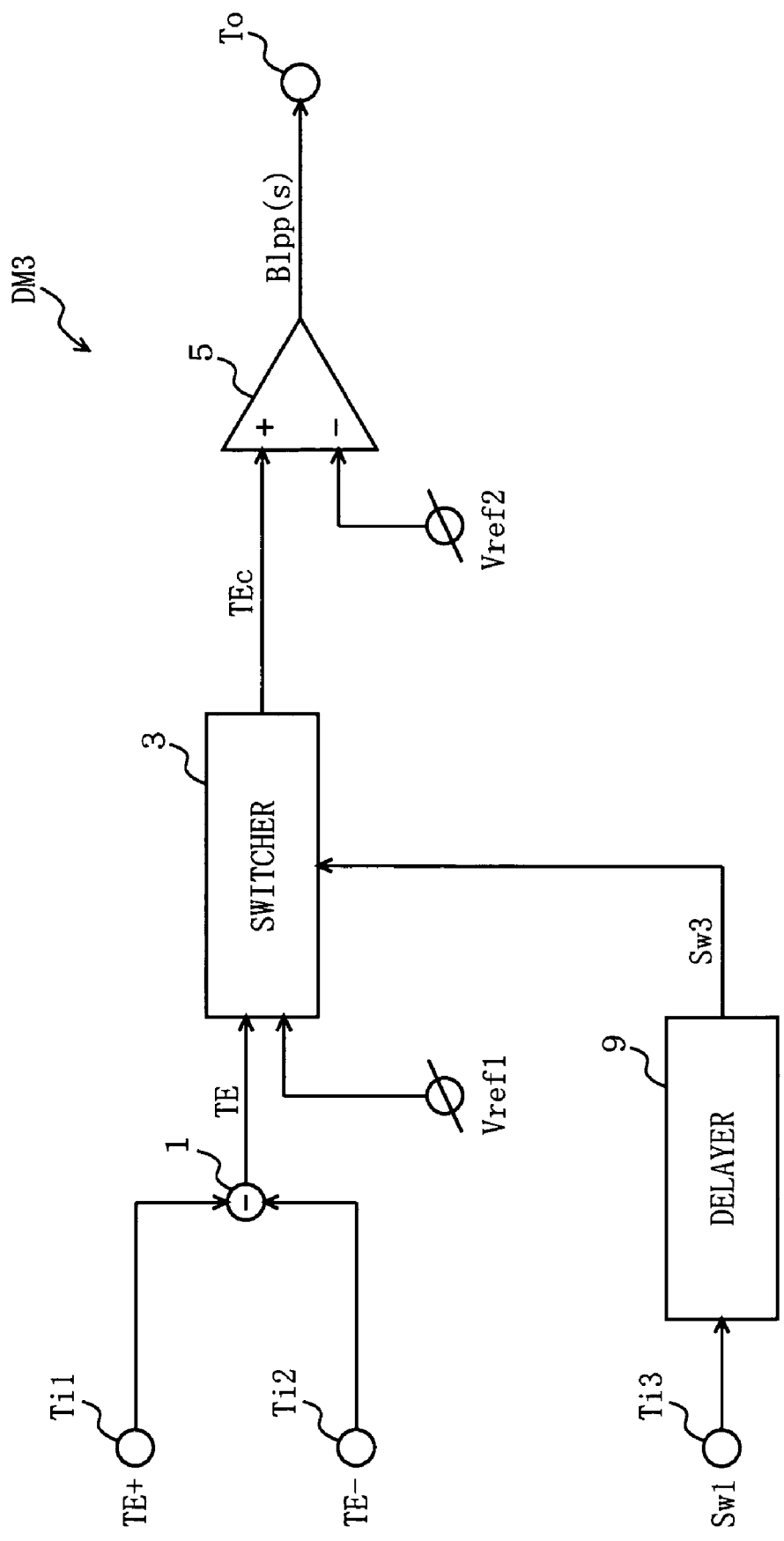
FIG. 3 is a block diagram showing the configuration of a land pre-pit address demodulating device according to a third embodiment of the present invention.

Referring to FIG. 3, a land pre-pit address demodulating device $DM_3$ according to a third embodiment includes a delayer 9 in place of the binarizer 7 included in the land pre-pit address demodulating device $DM_2$ shown in FIG. 2. As in the case of the land pre-pit address demodulating device $DM_1$, the third input terminal $T_{i3}$ is supplied with the first switch control signal $S_{w1}$, rather than the summation signal AS. The delayer 9 delays the first switch control signal $S_{w1}$ by a time difference $D_t$ between timing to switch from a mark to a space, or from a space to a mark, and a signal reflected from a mark or space portion actually detected by the tracking detector, and outputs the delayed first switch control signal $S_{w1}$ as a third switch control signal $S_{w3}$. The switcher 3 mutes a tracking error signal TE, which is reflected from the mark portion, by the first reference potential $V_{ref1}$ in accordance with the third switch control signal $S_{w3}$, and outputs a third mute tracking error signal $TE_c$. The time difference $D_t$ may be previously obtained in a suitable manner, e.g., by experiment.

The land pre-pit address demodulating device $DM_3$ is effective in a multiple-speed recording to an optical disc where the time difference $D_t$ between the tracking error signal TE and the first switch control signal $S_{w1}$ cannot be ignored. Specifically, the time difference $D_t$ between the tracking error signal TE and the first switch control signal $S_{w1}$ is previously obtained for each recording speed. The tracking error signal TE is muted in accordance with the third switch control signal $S_{w3}$, which is obtained by correction suitable for the recording speed, and therefore it is possible to accurately detect an LPP binarized signal $B_{lpp(s)}$. Note that the third mute tracking error signal $TE_c$ is basically the same as each of the above-described first and second mute tracking error signals $TE_a$ and $TE_b$ except that a timing signal for muting the third mute tracking error signal $TE_c$ is different from those for muting the first and second mute tracking error signals $TE_a$ and $TE_b$. Accordingly, the third mute tracking error signal $TE_c$ is distinguished from the first and second mute tracking error signals $TE_a$ and $TE_b$.

(Fourth Embodiment)

Figure 4:
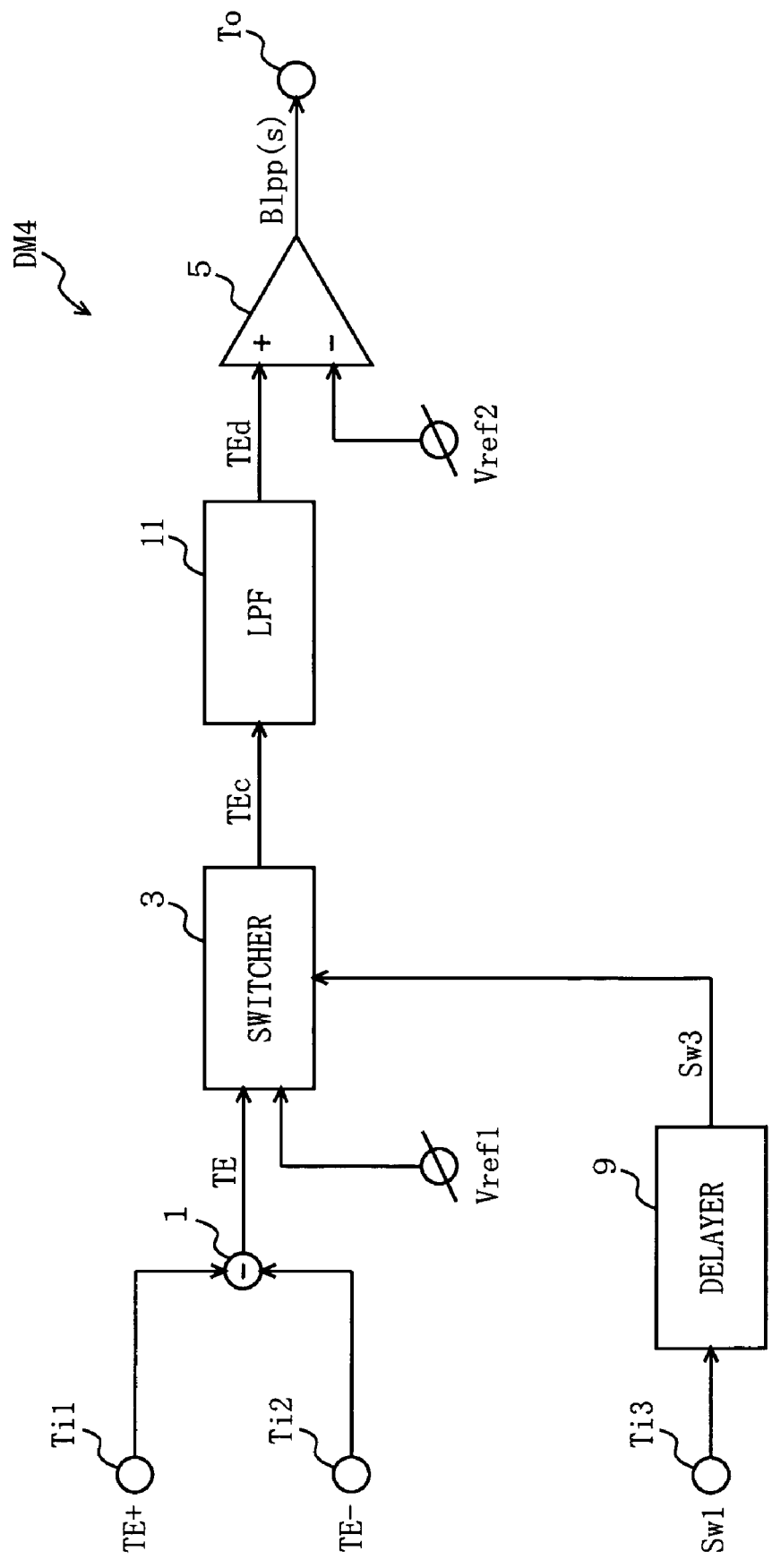
FIG. 4 is a block diagram showing the configuration of a land pre-pit address demodulating device according to a fourth embodiment of the present invention.

Referring to FIG. 4, a land pre-pit address demodulating device $DM_4$ according to a fourth embodiment additionally includes a low-pass filter (LPF) 11 between the switcher 3 and the comparator 5 in the land pre-pit address demodulating device $DM_3$ shown in FIG. 3. From the third mute tracking error signal $TE_c$ outputted from the switcher 3 after an RF residual component has been removed, the low-pass filter 11 removes switch noise added by the switcher 3, and outputs a fourth mute tracking error signal $TE_d$. The comparator 5 binarizes the fourth mute tracking error signal $TE_d$ with respect to the second reference potential $V_{ref2}$. Since the fourth mute tracking error signal $TE_d$ contains no switch noise, the comparator 5 can detect the LPP binarized signal $B_{lpp(s)}$ with higher accuracy.

The land pre-pit address demodulating device $DM_4$ is considerably advantageous where an unerased mark portion is misdetected as an LPP binarized signal $B_{lpp}$ due to deviation in switch timing, or where there is no voltage offset in the low-pass filter. Specifically, the land pre-pit address demodulating device $DM_4$ is able to remove noise of a higher frequency component from the LPP component $E_{lpp}$, and therefore can be adapted for multiple-speed recording by changing a cutoff frequency in accordance with a recording speed.

(Fifth Embodiment)

Referring to FIG. 5, a land pre-pit address demodulating device $DM_5$ according to a fifth embodiment additionally includes a variable gain amplifier (VGA) 13 between the low-pass filter 11 and the comparator 5 in the land pre-pit address demodulating device $DM_4$ shown in FIG. 4. The variable gain amplifier 13 amplifies, by an arbitrary gain, the fourth mute tracking error signal $TE_d$ obtained via switch noise removal by the low-pass filter 11, and outputs the amplified fourth mute tracking error signal $TE_d$ as a fifth mute tracking error signal $TE_e$. In general, the amplitude of the tracking error signal TE is decreased as a recording speed is increased. Accordingly, a gain is preset for each recording speed, and the preset gains are applied for use in the variable gain amplifier 13. The variable gain amplifier 13 obtains the fifth mute tracking error signal $TE_e$ such that differences in amplitude between recording speeds are accommodated, and therefore the comparator 5 is able to more accurately detect the LPP binarized signal $B_{lpp(s)}$.

In the land pre-pit address demodulating device $DM_5$, it is premised that there is no offset voltage up to the variable gain amplifier 13. Accordingly, the detection rate of the LPP binarized signal $B_{lpp(s)}$ during the high-speed recording is increased, and the comparator 5 is not required to adjust the level of the reference potential $V_{ref2}$ even if a recording speed is changed.

(Sixth Embodiment)

Figure 6:
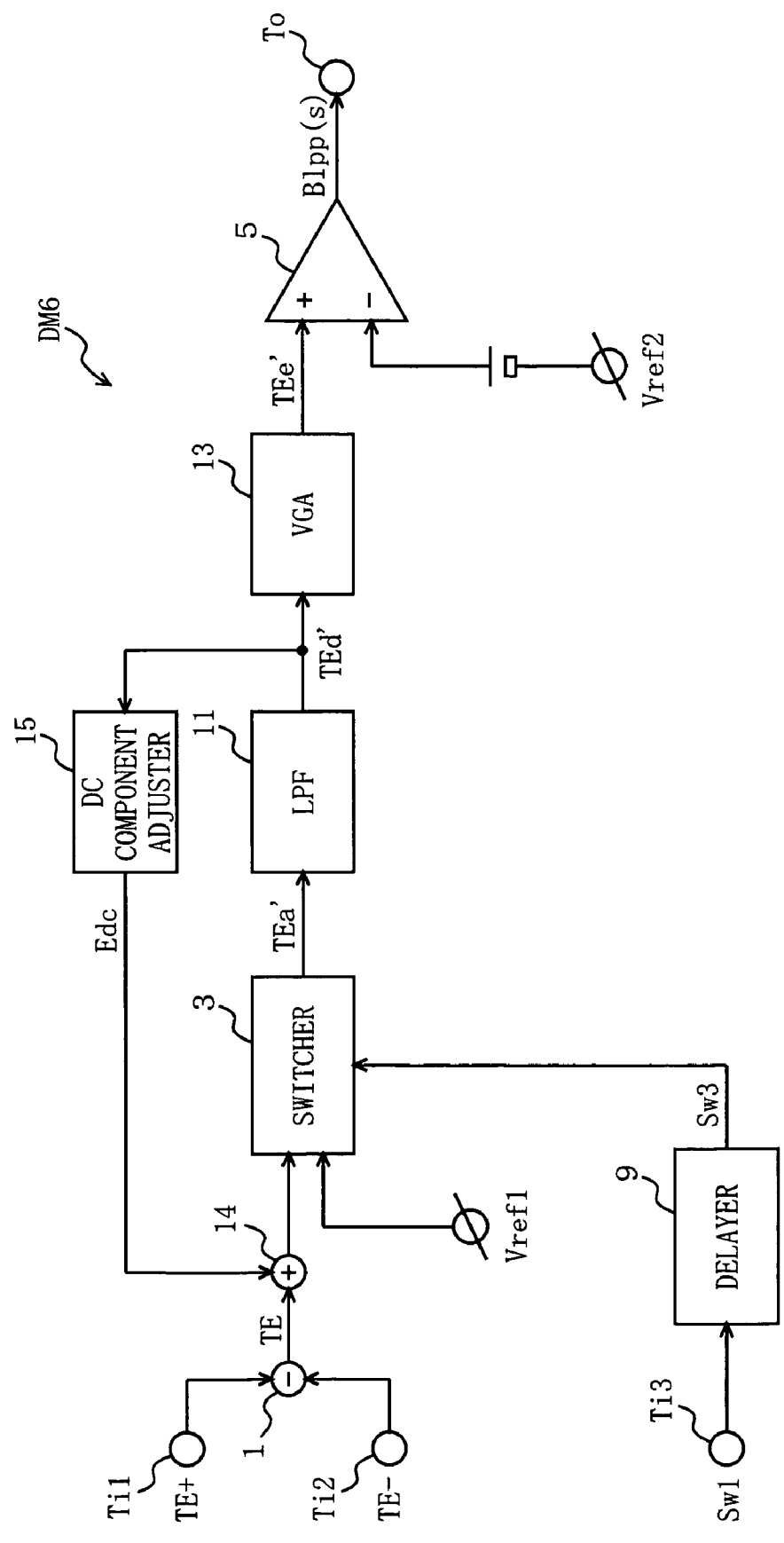
FIG. 6 is a block diagram showing the configuration of a land pre-pit address demodulating device according to a sixth embodiment of the present invention.

Referring to FIG. 6, a land pre-pit address demodulating device $DM_6$ according to a sixth embodiment additionally includes an adder 14 between the subtractor 1 and the switcher 3 in the land pre-pit address demodulating device $DM_5$ shown in FIG. 5. The land pre-pit address demodulating device $DM_6$ further includes a DC component adjuster 15 which returns, to the adder 14, a DC component of an output from the low-pass filter 11. The DC component adjuster 15 feeds a DC component of the first mute tracking error signal $TE_a$, from which switch noise has been removed, back upstream of the switcher 3 which removes an RF residual component.

As a result, a DC component of a signal to be inputted into a "+" port of the comparator 5 becomes equivalent to a DC component of the second reference potential $V_{ref2}$. Therefore, it is not necessary to perform a circuit offset voltage adjustment on a reference input (−) to the comparator 5 which is generated based on the second reference potential $V_{ref2}$, thereby achieving circuit simplification. Note that outputs from the switcher 3, the low-pass filter 11, and the variable gain amplifier 13 are basically the same as the above described first, fourth and fifth mute tracking error signals $TE_a$, $TE_d$ and $TE_e$, respectively. However, the sixth embodiment is different from the fifth embodiment in that the DC component of the fourth mute tracking error signal $TE_d$ is fed back to upstream. Accordingly, in the sixth embodiment, the outputs from the switcher 3, the low-pass filter 11, and the variable gain amplifier 13 are distinctively referred to as "first, fourth and fifth mute tracking error signals $TE_a$, $TE_d$, and $TE_e$", respectively.

As described above, in the land pre-pit address demodulating device $DM_6$, it is possible to equalize reference values of the reference potentials $V_{ref1}$ and $V_{ref2}$ each inputted into a corresponding one of the two input ports of the comparator 5. Accordingly, in the case where no wobble component $E_{wbl}$ is contained in the tracking error signal TE, it is not necessary to adjust a reference circuit offset voltage of the comparator 5 even if there are circuit offset voltages in the low-pass filter 11 and the variable gain amplifier 13. In the sixth embodiment, the DC component of the output from the low-pass filter 11 is returned upstream of the switcher 3. However, a similar effect can be achieved if the output from the variable gain amplifier 13 is returned in a similar manner.

(Seventh Embodiment)

Figure 7:
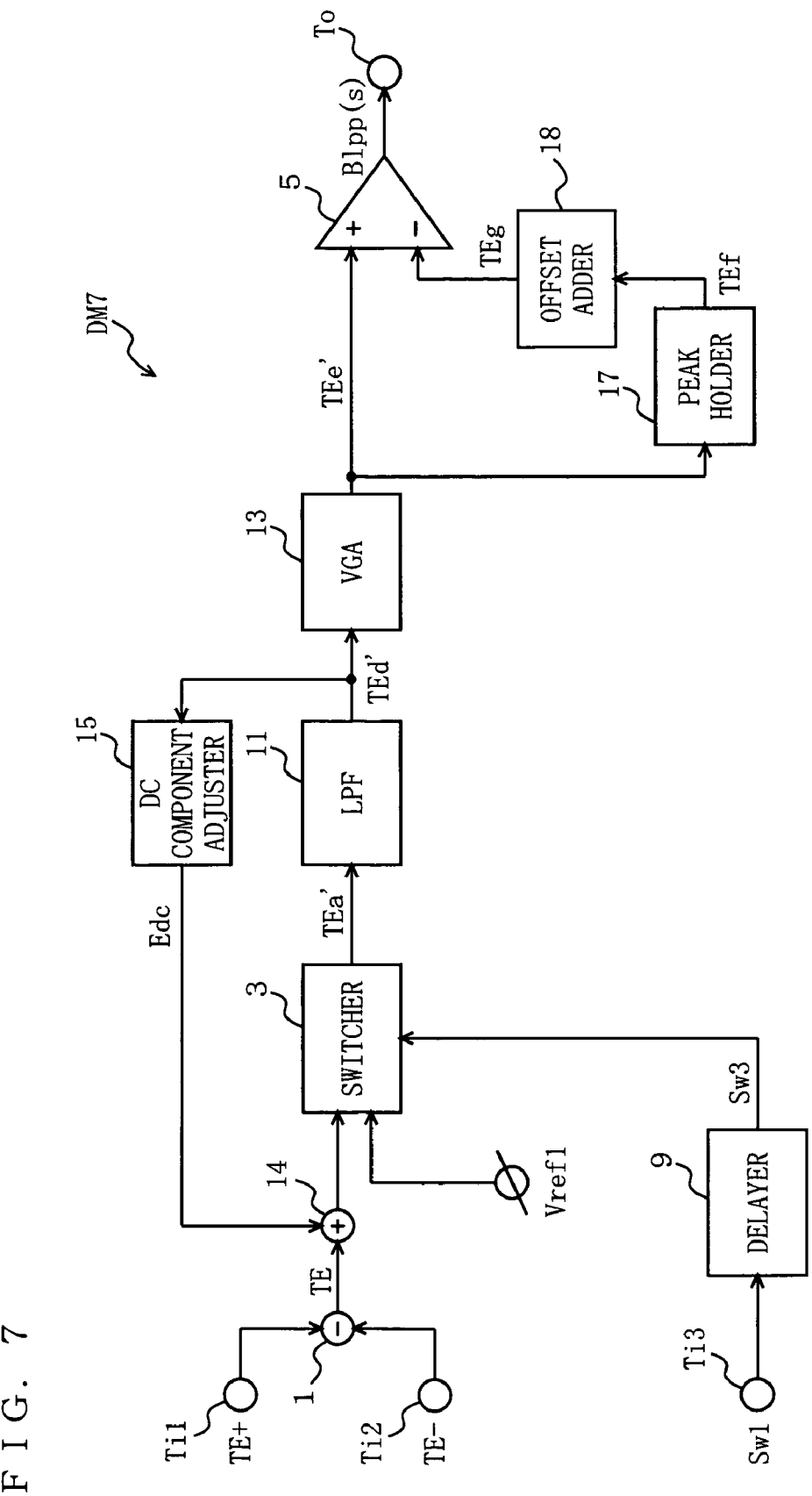
FIG. 7 is a block diagram showing the configuration of a land pre-pit address demodulating device according to a seventh embodiment of the present invention.

Referring to FIG. 7, a land pre-pit address demodulating device $DM_7$ according to a seventh embodiment includes a peak holder 17 and an offset adder 18 in place of the second reference potential $V_{ref2}$ coupled to the comparator 5 included in the land pre-pit address demodulating device $DM_6$ shown in FIG. 6. The peak holder 17 holds a peak value of the fourth mute tracking error signal $TE_{d'}$ outputted from the variable gain amplifier 13, and outputs a sixth tracking error signal $TE_f$. The offset adder 18 adds a prescribed offset to the sixth tracking error signal $TE_f$, and outputs a seventh tracking error signal $TE_g$. Slicing is performed with reference to a detected peak level of a wobble signal, and therefore it is possible to prevent the wobble signal itself from being sliced and misdetected. As a result, it is possible to more accurately detect the LPP binarized signal $B_{lpp(s)}$.

In the land pre-pit address demodulating device $DM_7$, a reference value of the comparator 5 is adjusted (or determined) in accordance with disc wobble, and therefore the wobble signal itself is not sliced and misdetected. Accordingly, the land pre-pit address demodulating device DM7 is considerably advantageous for use in a recording apparatus having a limited capability for multiple-speed recording. This is because the land pre-pit address demodulating device $DM_7$ is capable of accurately detecting the LPP binarized signal $B_{lpp(s)}$ even if the wobble signal is variable in amplitude. Further, droop current is set for each recording speed, and therefore the land pre-pit address demodulating device $DM_7$ is adaptable for a high-speed recording.

(Eighth Embodiment)

Figure 8:
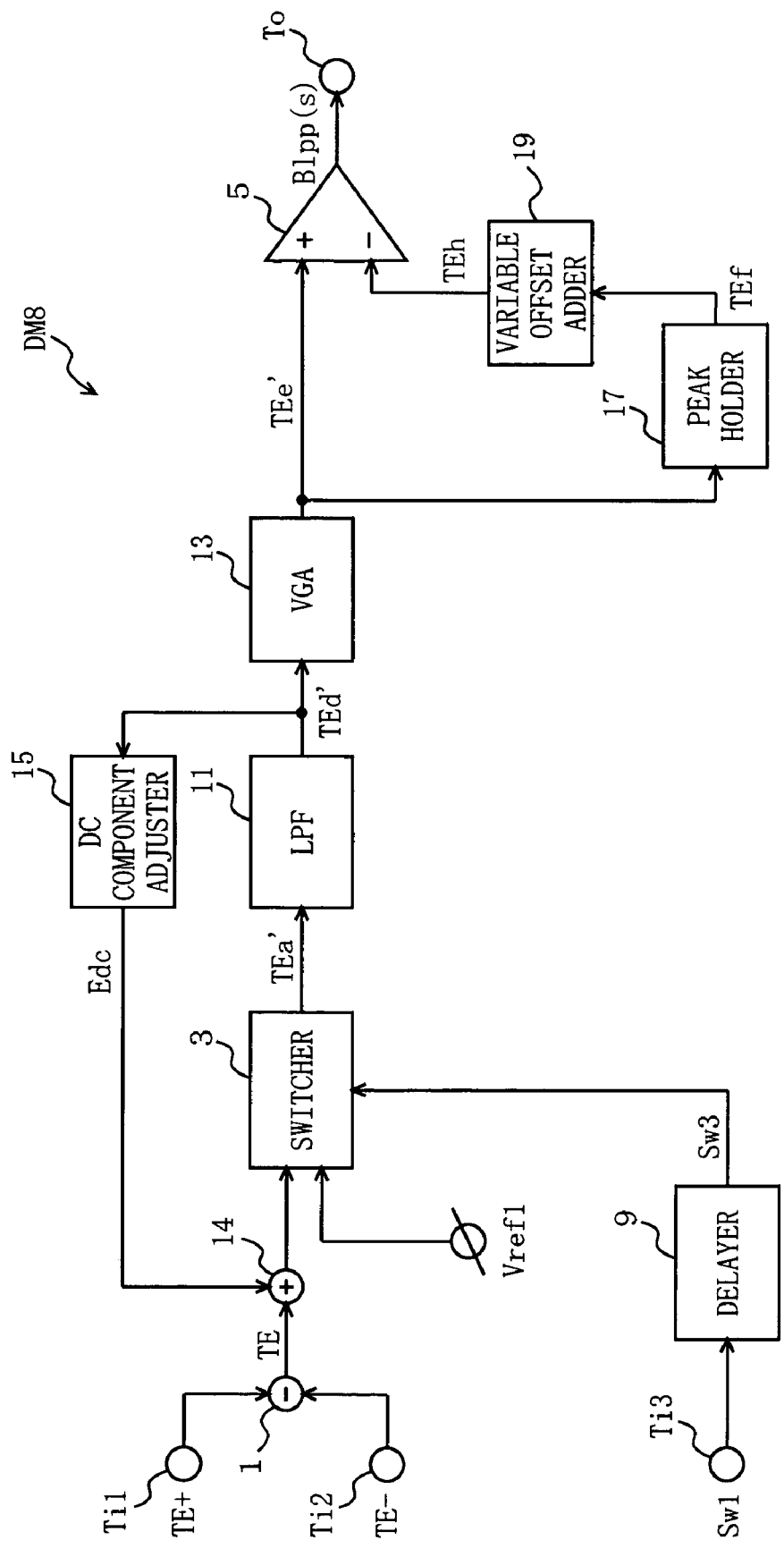
FIG. 8 is a block diagram showing the configuration of a land pre-pit address demodulating device according to an eighth embodiment of the present invention.

Referring to FIG. 8, a land pre-pit address demodulating device $DM_8$ according to an eighth embodiment includes a variable offset adder 19 in place of the offset adder 18 included in the land pre-pit address demodulating device $DM_7$ shown in FIG. 7. The variable offset adder 19 adds a difference in voltage level of an LPP amplitude between recording speeds to the sixth tracking error signal $TE_f$ outputted from the peak holder 17, and outputs an eighth tracking error $TE_h$. The land pre-pit address demodulating device $DM_8$ is considerably advantageous where a difference in voltage level of the LPP amplitude between different recording speeds is in a range which can be accommodated via processing by the variable offset adder 19.

(Ninth Embodiment)

Figure 9:
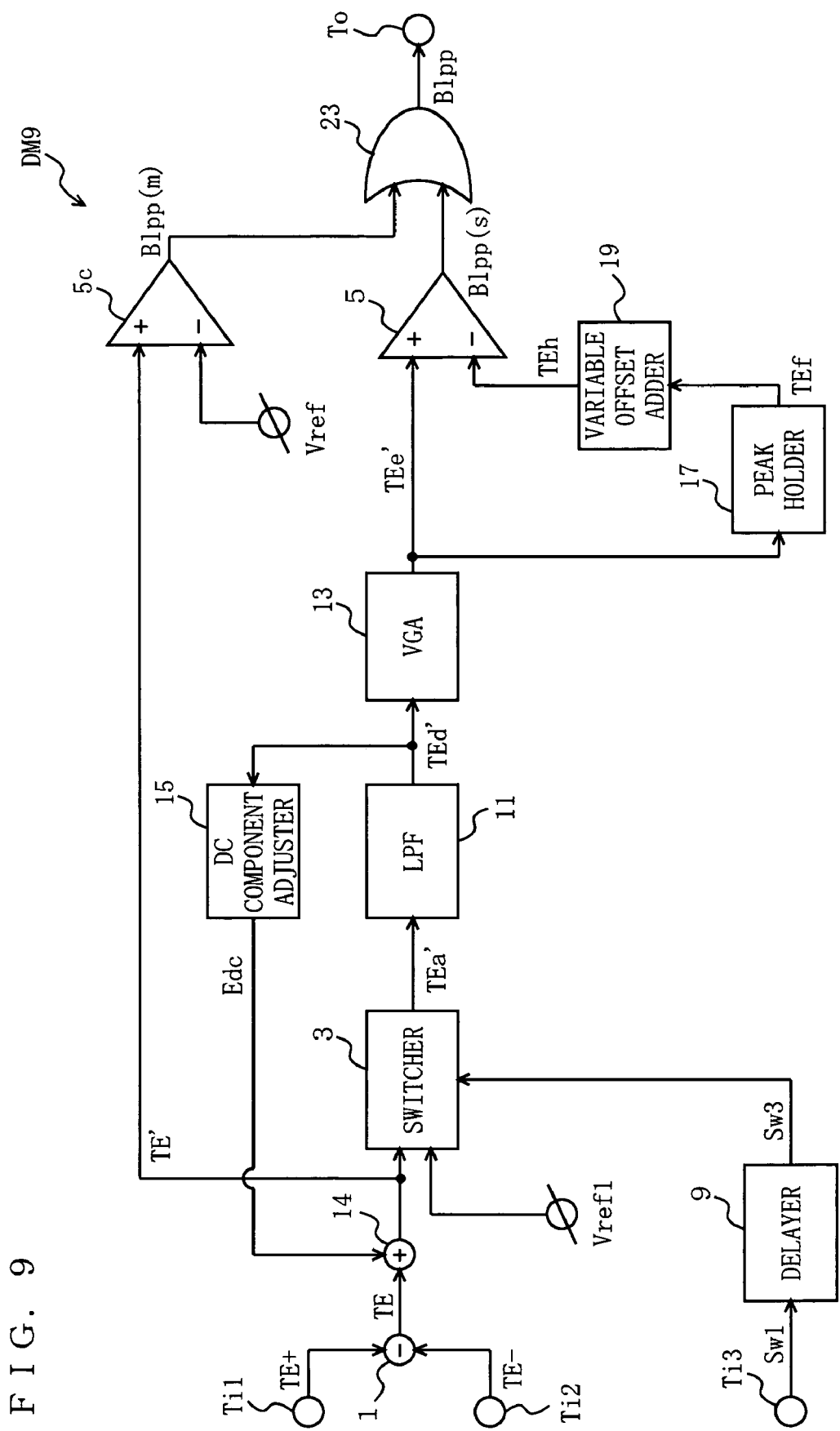
FIG. 9 is a block diagram showing the configuration of a land pre-pit address demodulating device according to a ninth embodiment of the present invention.

Referring to FIG. 9, a land pre-pit address demodulating device $DM_9$ according to a ninth embodiment additionally includes an OR circuit 23 between the comparator 5 and the output terminal $T_o$ in the land pre-pit address demodulating device $DM_8$ shown in FIG. 8. An output of the comparator 5 is inputted into one of two input ports of the OR circuit 23. The land pre-pit address demodulating device $DM_9$ further includes a comparator $5_c$ which receives an output of the adder 14 at a "+" side input terminal and the second reference potential $V_{ref2}$ at a "−" side input terminal. An output terminal of the comparator $5_c$ is coupled to the other input port of the OR circuit 23.

Figure 12:
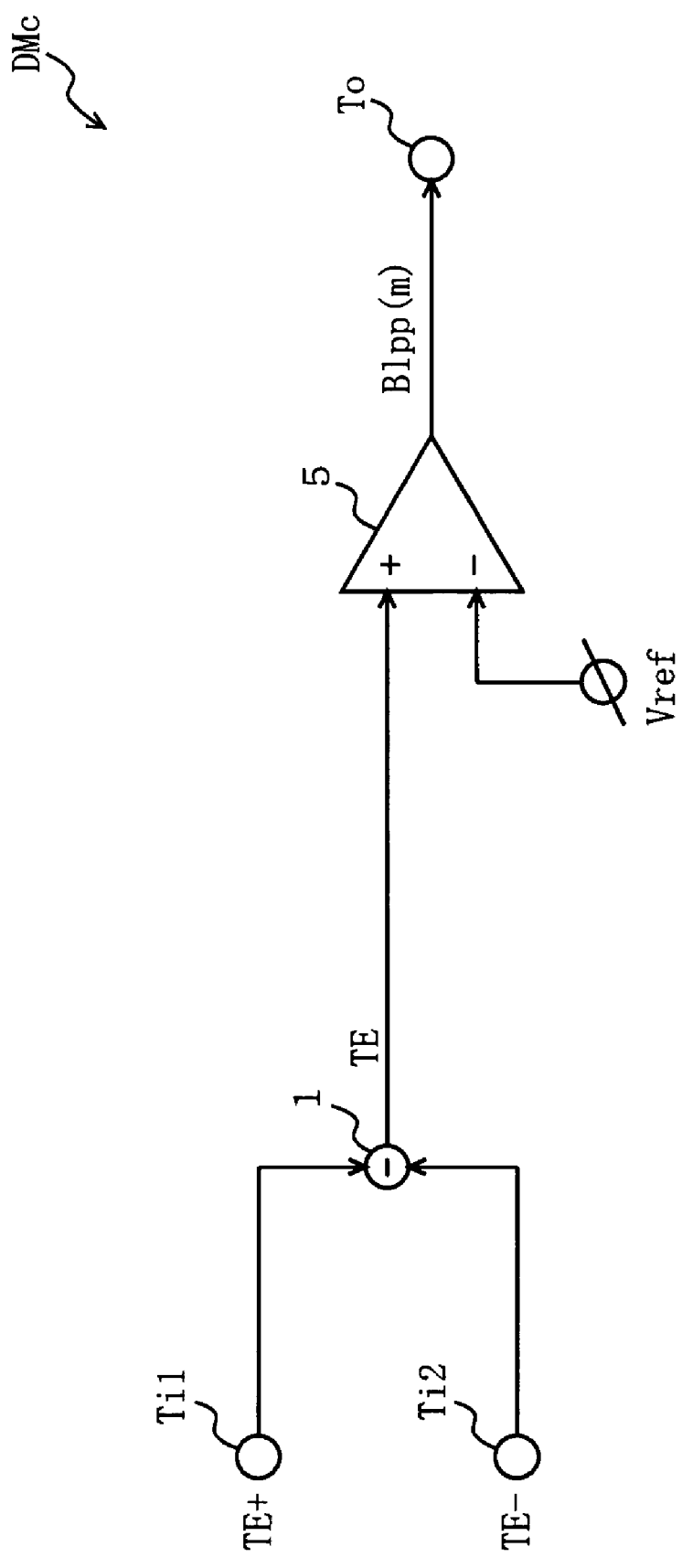
FIG. 12 is a block diagram showing the configuration of a conventional land pre-pit address demodulating device.
Figure 13:
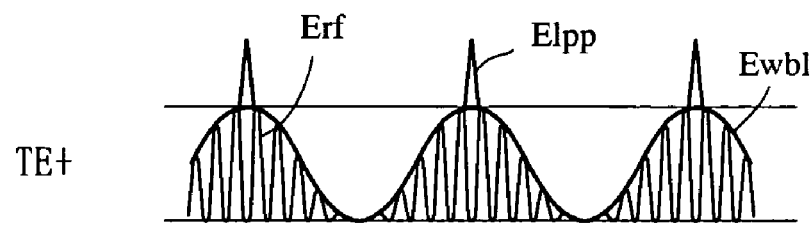
FIG. 13 is a diagram schematically showing the waveform of a TE+ signal.
Figure 14:
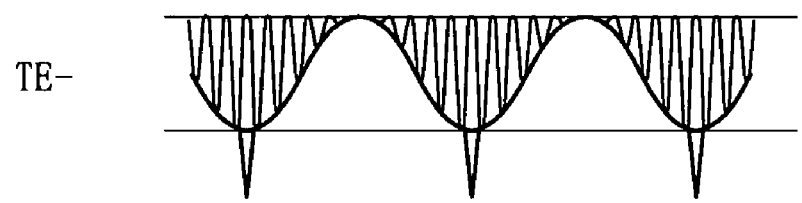
FIG. 14 is a diagram schematically showing the waveform of a TE− signal.
Figure 15:
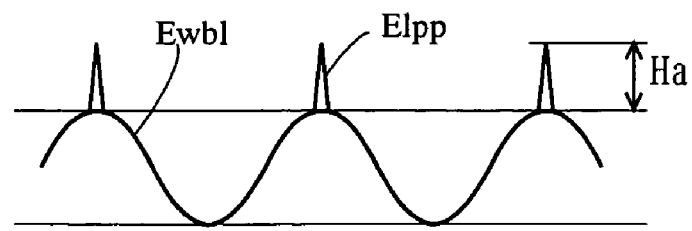
FIG. 15 is a diagram schematically showing the waveform of a tracking error signal obtained in an on-track mode.
Figure 16:
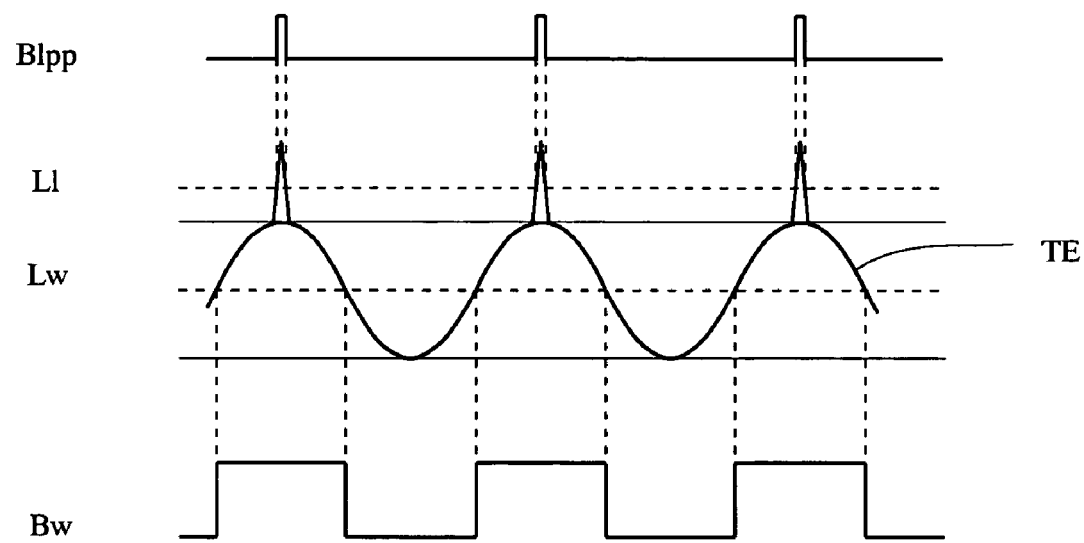
FIG. 16 is a diagram used for explaining how the tracking error signal shown in FIG. 15 is binarized to obtain a WBL signal and an LPP signal.
Figure 17:
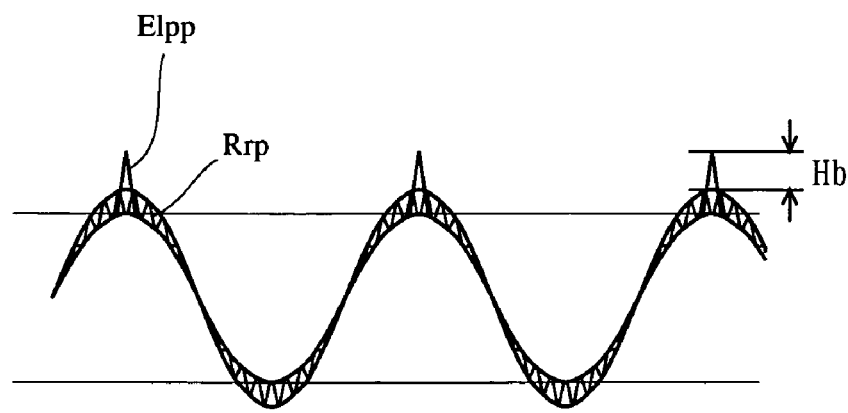
FIG. 17 is a diagram schematically showing the waveform of a tracking error signal obtained in an off-track mode.
Figure 18:
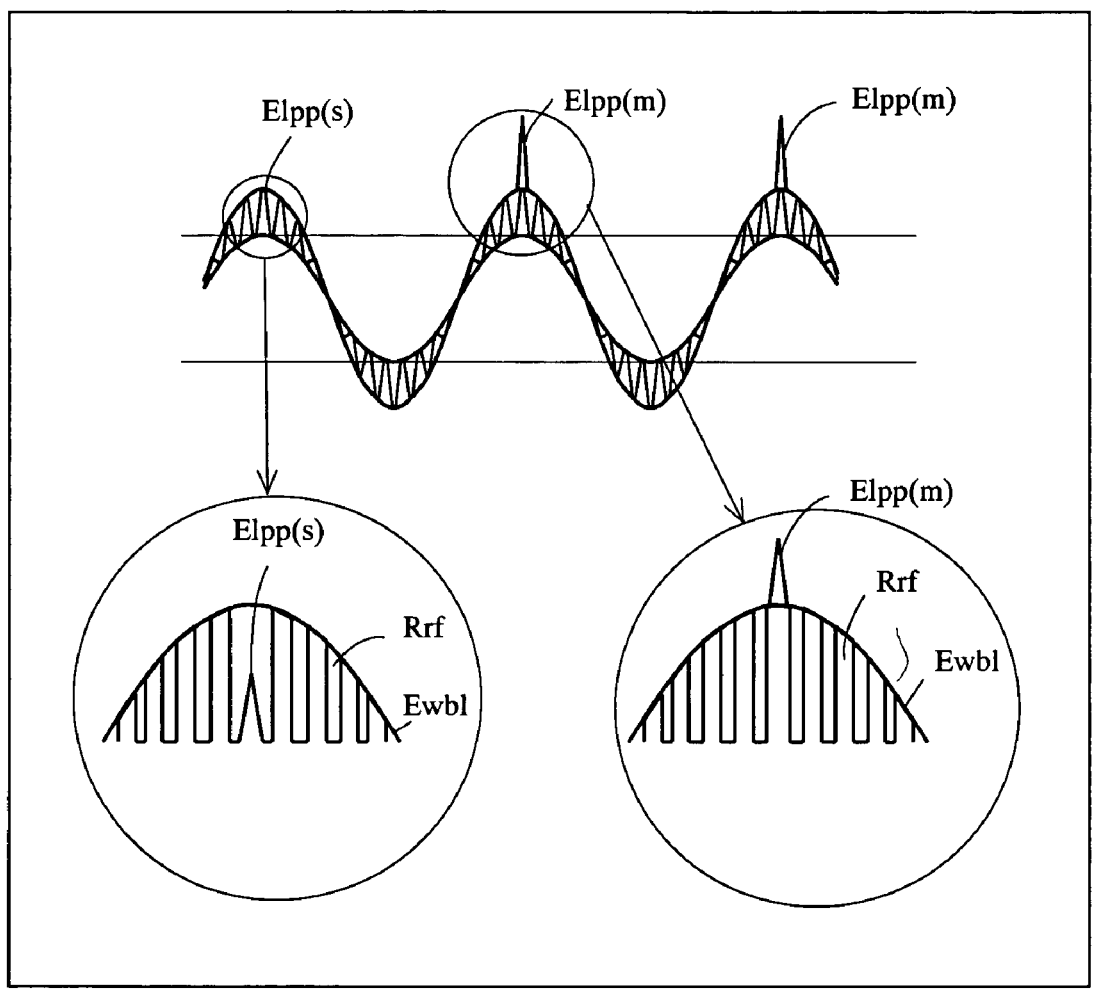
FIG. 18 is a diagram used for explaining that in a tracking error signal in an off-track mode generated by a conventional land pre-pit address demodulating device, an LPP component corresponding to a space portion is buried in an RF component, and therefore cannot be detected.

The comparator $5_c$ is the same as that used in the conventional land pre-pit address demodulating device $DM_c$ shown in FIG. 12. In the land pre-pit address demodulating device $DM_9$, the first and second input terminals $T_{i1}$ and $T_{i2}$, the subtractor 1, and the adder 14 form a land pre-pit address demodulating device substantially equivalent to the land pre-pit address demodulating device $DM_c$. The land pre-pit address demodulating device $DM_c$ has a difficulty in detecting an LPP binarized signal $B_{lpp(s)}$ but can detect an LPP binarized signal $B_{lpp(m)}$.

On the other hand, each of the land pre-pit address demodulating devices $DM_1$ through $DM_8$ according to the present invention is able to detect the LPP binarized signal $B_{lpp(m)}$ with high accuracy, but unable to detect the LPP binarized signal $B_{lpp(m)}$.

However, in the land pre-pit address demodulating device $DM_9$, a logical sum is taken for an output of the comparator 5 (i.e., the LPP binarized signal $B_{lpp(s)}$) and an output of the comparator $5_c$ (i.e., the LPP binarized signal $B_{lpp(m)}$), and therefore an LPP binarized signal $B_{lpp}$ can be detected for each recording speed based on a light beam reflected by a DVD-R/RW disc.

Accordingly, the land pre-pit address demodulating device $DM_9$ is configured by adding two elements, i.e., the comparator $5_c$ and the OR circuit 23, to either one of the land pre-pit address demodulating devices $DM_1$ through $DM_8$ according to the present invention, which includes the first and second input terminals $T_{i1}$ and $T_{i2}$, the subtractor 1, and the adder 14. The land pre-pit address demodulating device $DM_9$ configured in such a simple manner is able to detect both the LPP binarized signal $B_{lpp(s)}$, which is conventionally hard to be detected during a high-speed recording, and the LPP binarized signal $B_{lpp(m)}$, which cannot be detected during a high-speed recording by the land pre-pit address demodulating devices $DM_1$ through $DM_8$ according to the present invention.

Figure 10:
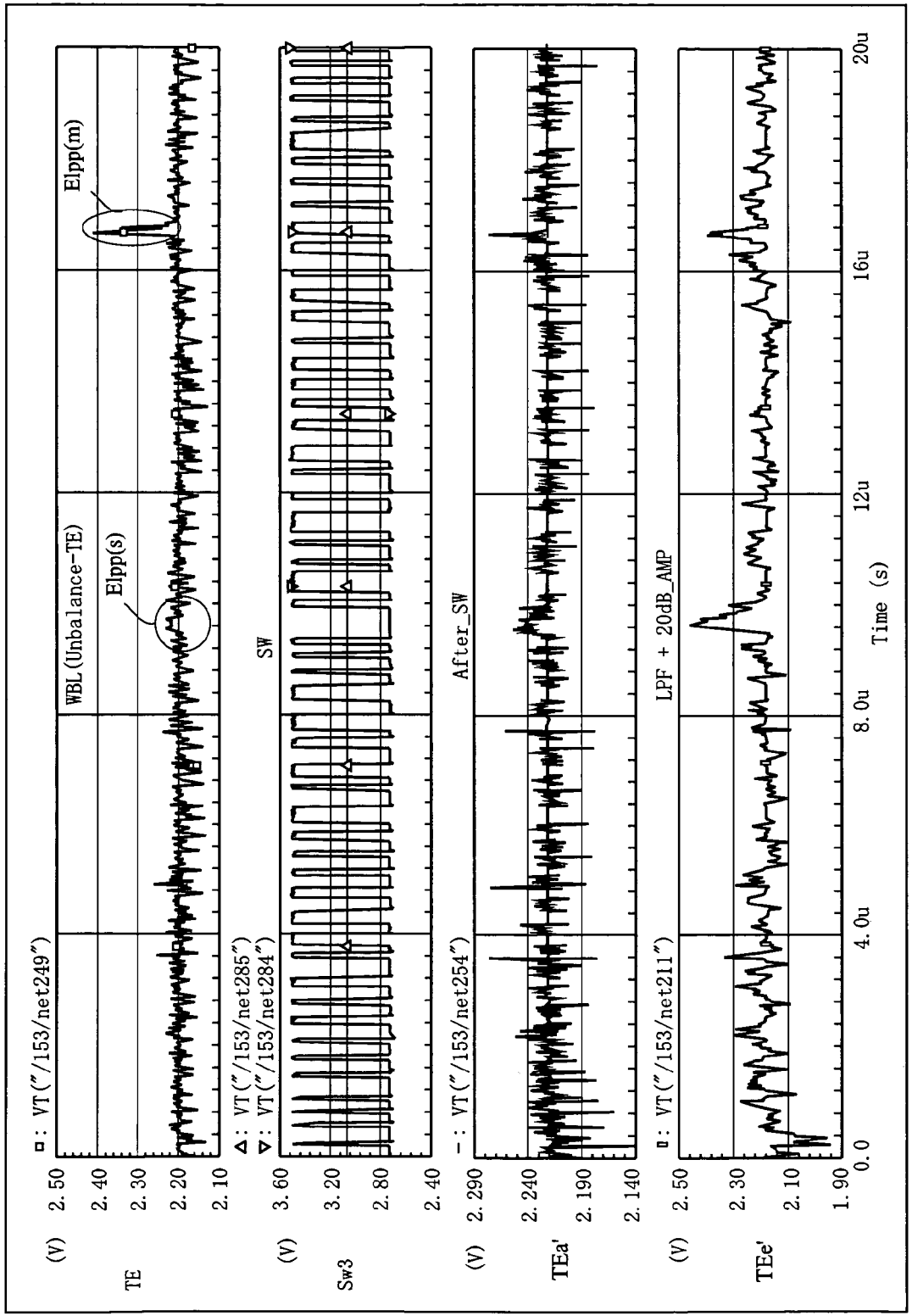
FIG. 10 is a diagram showing waveforms of various signals observed in the land pre-pit address demodulating device shown in FIG. 9.
Figure 11:
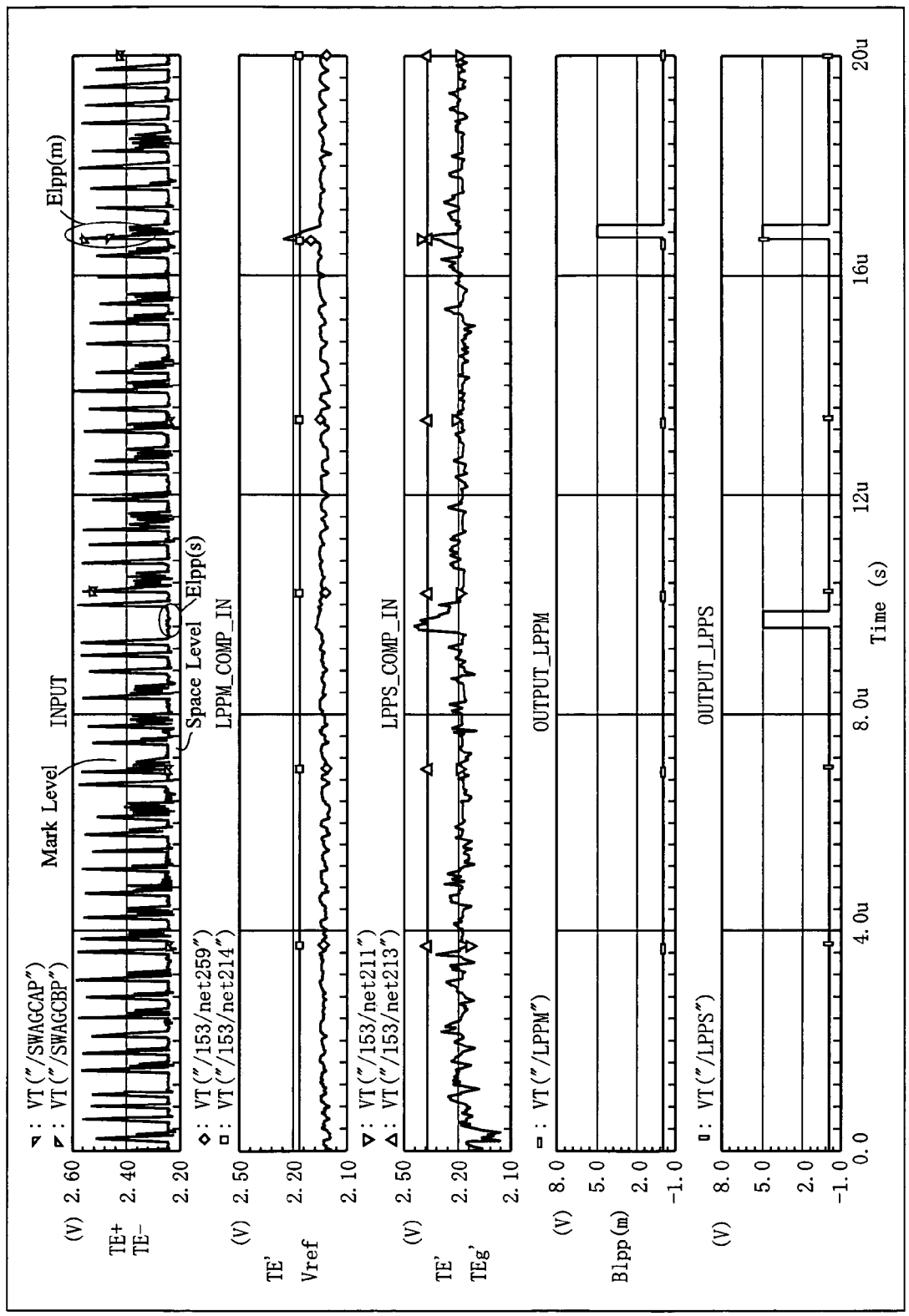
FIG. 11 is a diagram showing waveforms of various signals other than those shown in FIG. 10 and observed in the land pre-pit address demodulating device shown in FIG. 9.

Next, a brief description is provided for a signal processing operation of the land pre-pit address demodulating device $DM_9$ with reference to FIGS. 10 and 11 showing exemplary waveforms of various signals. Firstly, refer to the top of FIG. 11 to see a waveform for TE+ and TE− signals respectively inputted into the first and second input terminals $T_{i1}$ and $T_{i2}$. In this waveform, a mark level, a space level, LPPs for spaces (LPPSs), and LPPs for marks (LPPMs) can be recognized. As described above, in an on-track mode, the TE+ and TE− signals have an identical amplitude and their signs are opposite to each other.

Next, refer to the top of FIG. 10 to see a waveform of the tracking error signal TE outputted from the subtractor 1. As a result of subtracting the TE− signal from the TE+ signal, the tracking error signal TE has an LPP component $E_{lpp(m)}$ of a mark noticeably projecting from the RF component $E_{rf}$, while an LPP component $E_{lpp(s)}$ of a space is buried in the RF component $E_{rf}$.

Next, refer to the second row from the top of FIG. 10 to see a waveform of the third switch control signal $S_{w3}$ outputted from the delayer 9. In this waveform, a high level shows a timing on which a signal reflected by the mark portion is inputted.

Refer to the third row from the top of FIG. 10 to see a waveform of the first mute tracking error signal $TE_{a'}$ outputted from the switcher 3. From this waveform, it can be appreciated that the first mute tracking error signal $TE_{a'}$ is fixed in level at a predetermined value (i.e., the first reference potential $V_{ref1}$) where the first mute tracking error signal $TE_{a'}$ is in synchronization with a high level of the third switch control signal $S_{w3}$.

Refer to the bottom of FIG. 10 to see a waveform of the fifth mute tracking error signal $TE_{e'}$ outputted from the variable gain amplifier 13. From this waveform, it can be appreciated that in comparison to the tracking error signal $TE_a$ outputted from the switcher 3, a high frequency component is removed by the low-pass filter 11, and the amplitude is increased by the variable gain amplifier 13.

Refer to the second row from the top of FIG. 11 to see a waveform of the tracking error signal TE' inputted into the comparator 5c and a waveform of the reference potential $V_{ref}$. The tracking error signal TE' is obtained by adding the tracking error signal TE with an adjusted DC component of the fourth mute tracking error signal $TE_{d'}$ outputted from the low-pass filter 11. Accordingly, in comparison the tracking error signal TE, the pedestal level of the tracking error signal TE' is increased with the pedestal level of the tracking error signal TE'. Note that the reference potential $V_{ref}$ is fixed at a specific value.

Refer to the third row from the top of FIG. 11 to see a waveform of the tracking error signal $TE_{e'}$ outputted from the variable gain amplifier 13 and a waveform of the tracking error signal $TE_h$ outputted via the peak holder 17 and the variable offset adder 19. The tracking error signal $TE_{e'}$ is amplified more than the tracking error signal $TE_{d''}$.

Refer to the fourth row from the top of FIG. 11 to see a waveform of the LPP binarized signal $B_{lpp(m)}$ outputted from the comparator 5c. From this waveform, it is appreciated that the LPPMs are detected.

Next, refer to the bottom of FIG. 11 to see a waveform of the LPP binarized signal $B_p$ outputted from the OR circuit 23. By performing an OR operation on outputs of the comparators 5 and $5_c$, it is made possible to detect both the LPP binarized signal $B_{lpp(m)}$ and the LPP binarized signal $B_{lpp(s)}$ which cannot be detected by a device other than the above-described conventional land pre-pit address demodulating device DM and the land pre-pit address demodulating device $DM_9$.

As is apparent from the foregoing, the present invention can be applied to an optical disc recording/reproduction apparatus capable of high-speed recording to a DVD-R/RW disc, for example.

While the invention has been described in detail, the foregoing description is in all aspects illustrative and not restrictive. It is understood that numerous other modifications and variations can be devised without departing from the scope of the invention.

What is claimed is:

1. A land pre-pit address demodulating device for use in an optical disc recording apparatus which irradiates a DVD-R/RW disc with a laser beam, the optical disc recording apparatus switching a power of the laser beam between first and second intensities so as to generate an amorphous region with the laser beam of the first intensity and a recrystallized region with the laser beam of the second intensity, thereby recording information to the DVD-R/RW disc, the land pre-pit address demodulating device detecting land pre-pit address information from the laser beam reflected by the DVD-R/RW disc, the device comprising:

a generation section for generating a tracking error signal from the reflected laser beam;

a first reference potential section for supplying a first reference potential lower than a potential of the tracking error signal;

a laser intensity indicating section for indicating whether the reflected laser beam from which the tracking error signal is generated is of the first intensity or the second intensity;

an RF residual component removing section for removing an RF residual component from the tracking error signal by muting the tracking error signal with the first reference potential during a period in which the tracking error signal is generated from the reflected laser beam of the first intensity; and a land pre-pit address signal detection section for comparing the tracking error signal from which the RF residual component has been removed to a second reference potential and detecting a land pre-pit address signal.

2. The land pre-pit address demodulating device according to claim 1, wherein the laser intensity indicating section generates a laser beam intensity switch signal.

3. The land pre-pit address demodulating device according to claim 2, wherein the laser intensity indicating section generates a pulsed signal by binarizing a summation signal of the reflected laser beam.

4. The land pre-pit address demodulating device according to claim 2, wherein the laser intensity indicating section includes a delay section for delaying the laser beam intensity switch signal by a time period required from reflection of the laser beam by the DVD-R/RW disc until generation of the tracking error signal.

5. The land pre-pit address demodulating device according to claim 2, further comprising a low-pass filter for removing a high frequency component from the muted tracking error signal.

6. The land pre-pit address demodulating device according to claim 5, further comprising an amplifier section for amplifying the tracking error signal from which the high frequency component has been removed, by an amount equivalent to a reduction in amplitude due to a change of a recording speed.

7. The land pre-pit address demodulating device according to claim 6, further comprising a DC adjustment section for feeding back to the RF residual component removing section the tracking error signal from which the high frequency component has been removed.

8. The land pre-pit address demodulating device according to claim 7, further comprising a peak-hold section for peak-holding the amplified tracking error signal and an offset adding section for adding an offset to the amplified and peak-held tracking error signal, wherein the land pre-pit address signal detecting section compares the amplified tracking error signal with the amplified and peak-held tracking error signal having the offset added thereto, thereby detecting the land pre-pit address signal.

9. The land pre-pit address demodulating device according to claim 8, further comprising a variable offset adding section for adding a variable offset to the amplified and peak-held tracking error signal, wherein the land pre-pit address detecting section compares the amplified tracking error signal with the amplified and peak-held tracking error signal having the variable offset added thereto, thereby detecting the land pre-pit address signal.

10. The land pre-pit address demodulating device according to claim 1, further comprising a third reference potential section for supplying a third reference potential lower than the potential of the tracking error signal, wherein the land pre-pit address signal detecting section compares the tracking error signal with the third reference potential, thereby detecting the land pre-pit address signal.

* * * * *